3,053,629
PROCESS FOR PRODUCING TRANSITION
METAL CARBONYLS
Roy L. Pruett, Charleston, W. Va., and John E. Wyman, Topsfield, Mass., assignors to Union Carbide Corporation, a corporation of New York
No Drawing. Filed Oct. 16, 1959, Ser. No. 846,772
15 Claims. (Cl. 23—203)

This invention relates to metal carbonyls. More particularly, the invention relates to a process for producing transition metal carbonyls.

The metal carbonyls which may be produced by the process of this invention include mononuclear carbonyls such as molybdenum hexacarbonyl, $Mo(CO)_6$, and binuclear carbonyls such as dimanganese decacarbonyl, $Mn_2(CO)_{10}$, and may be represented by the formula $$M(CO)_{\frac{n}{2}} \text{ if } n \text{ is even}$$

$$M_2(CO)_{n-1} \text{ if } n \text{ is odd}$$

wherein M is a transition metal, $n$ is an integer defined by the equation $n = G - A$, A is the atomic number of M, and G is the atomic number of the next higher rare gas. That is, $n$ is equal to the difference between the atomic number of the rare gas next above M in the periodic classification of the chemical elements and the atomic number of M. For example, if M is cobalt, G is equal to 36 (the atomic number of the rare gas krypton), A is equal to 27 (the atomic number of cobalt), $n$ is equal to 9 and the formula becomes $Co_2(CO)_8$. Similarly, if M is tungsten, $n = 86 - 74 = 12$ and the formula becomes $W(CO)_6$.

The term "transition metal" as used herein means a metal from groups VB, VIB, VIIB and VIII of the periodic classification of the elements as set forth in the Handbook of Chemistry and Physics, 40th edition, Chemical Rubber Publishing Company, 1958, pages 448 and 449.

The transition metals which form mononuclear carbonyls are those of group VIB and the following elements from group VIII, iron, ruthenium, osmium, nickel, palladium and platinum. The transition metals which form binuclear carbonyls are those in groups VB and VIIB and the following metals from group VIII, cobalt, rhodium and iridium.

The process of the present invention is based upon the discovery that the reaction of a transition metal halide, an alkali metal, a particular class of aromatic hydrocarbon catalysts and carbon monoxide in a particular class of solvents results in the reduction of the transition metal and the formation of transition metal-carbonyl bonds. For transition metals which form mononuclear carbonyls, this reaction produces such metal carbonyls directly. For transition metals which form binuclear carbonyls this reaction results in the formation of compounds having the formula $$LM(CO)_{\frac{n-1}{2}}$$

wherein M and $n$ have the meaning defined hereinabove and L represents an alkali metal. Acidification of such alkali metal compounds results in the formation of the binuclear carbonyls.

Broadly stated the process of the present invention comprises contacting under reactive conditions, for example by mixing together, the following: (1) an anhydrous transition metal halide, (2) an alkali metal, (3) catalytic amounts of at least one aromatic hydrocarbon compound capable of forming addition complexes with alkali metals, (4) a liquid organic ether solvent in which such aromatic hydrocarbon-alkali metal addition complexes will form, and (5) carbon monoxide gas under pressure.

Certain aromatic hydrocarbons are capable of forming addition complexes with alkali metals, particularly lithium, sodium and potassium, in a relatively restricted class of solvents. For a discussion of such complexes see, for example, Scott et al., J. Am. Chem. Soc, 58, 2442 (1936). In general the aromatic hydrocarbons capable of forming addition complexes are polyphenyls, alkyl-substituted polyphenyls, naphthalene, alkyl-substituted naphthalenes and aryl-substituted naphthalenes. Certain other aromatic hydrocarbons, for example naphthacene and 1, 2-benzanthracene, also form such complexes.

For use in the present invention, the preferred ether solvents in which aromatic hydrocarbon-alkali metal addition complexes may be formed are cyclic aliphatic ethers having not more than an average of about 4 carbon atoms per oxygen atom and non-cyclic aliphatic ethers which contain a methoxy group and which have not more than an average of about 4 carbon atoms per oxygen atom. Certain other ether solvents which do not contain methoxy groups also permit the formation of such complexes, for example, ethylorthoformate.

Illustrative of the transition metal halides which are operable in the process of this invention are the following: nickel dibromide, ruthenium dichloride, cobalt dibromide, iron dibromide, rhenium trichloride, manganese diiodide, molybdenum pentaiodide, tungsten hexabromide, chromium trichloride, vanadium tribromide and the like.

Any alkali metal is operable in the process of this invention although sodium, potassium and lithium are preferred. The alkali metal most preferred is sodium in the form of a sodium dispersion in an inert solvent such as xylene or mineral oil.

Representative members of the class of operable aromatic hydrocarbon catalysts are diphenyl, terphenyl, quaterphenly, p,p'-dimethyl diphenyl, p-ethyl diphenyl, 3,3',5,5'-tetramethyl diphenyl, p-(2-ethylhexyl)diphenyl, p-ethyl-terphenyl, 2-ethyl naphthalene, 1,4-dimethyl naphthalene, 1-n-butyl naphthalene, 2-phenyl naphthalene, 1-methyl-8-isopropyl naphthalene and the like. The catalysts most preferred are diphenyl and naphthalene.

Examples of the class of operable ether solvents are dimethyl ether, methylethyl ether, methyl isopropyl ether, dioxane, ethylene glycol dimethyl ether, ethylene glycol methylpropyl ether, ethylene glycol formal, methylal, ethyl orthoformate, glycerol trimethyl ether and tetrahydrofuran. Mixtures of the ether solvents are also operable as are mixtures of these ether solvents with inert hydrocarbons such as xylene or kerosene.

The process of this invention may be conveniently carried out by mixing together in a suitable reaction vessel, preferably a pressure vessel such as an autoclave, the transition metal halide, the alkali metal, the aromatic hydrocarbon catalyst and the solvent. In a preferred embodiment of the process, the reaction vessel is pressurized with carbon monoxide before the alkali metal and metal halide are brought into reactive contact. This may be conveniently accomplished, for example, by introducing the alkali metal into the reaction vessel in sealed glass ampoules. The ampoules may then be broken by rocking, or other suitable means, after the vessel has been pressurized with carbon monoxide.

The amount of alkali metal used should preferably be at least enough to reduce the metal in the transition metal halide to a valence of zero for metals which form mononuclear carbonyls and to a valence of minus one for metals which form binuclear carbonyls. For example, if the halide is vanadium tribromide about four moles of alkali metal per mole of vanadium tribromide should be used, while if the metal halide is chromium trichloride about three moles of alkali metal should be employed.

The use of up to about a 10 percent stoichiometric excess of alkali metal above the amount required to reduce the transition metal to a minus one or zero valence state has been found advantageous. The use of alkali metal in amounts substantially smaller than those described hereinabove results in reduced yields of the desired carbonyl reaction product.

The amount of aromatic hydrocarbon catalyst employed in the reaction may vary from about one to about 100 mole percent based on the amount of alkali metal while the preferred amount of catalyst is from about 5 to 10 mole percent. The preferred catalysts are naphthalene and diphenyl.

The quantity of ether solvent is not critical but a convenient amount is from 10 to 20 times the weight of metal halide used. In general, tetrahydrofuran and ethylene glycol dimethyl ether are the solvents most preferred. For group VIB elements, however, tetrahydrofuran is not a preferred solvent.

After the metal halide, alkali metal, catalyst and solvent have been placed in the reaction vessel, it may then be sealed and pressurized with carbon monoxide. The carbon monoxide pressure must be at least 15 pounds per square inch gauge (p.s.i.g.) with a preferred pressure range of about 450 to 2500 p.s.i.g. Higher pressures may be employed but without substantial improvement in the yield of desired product.

The reactants are then maintained under carbon monoxide pressure at a temperature of from about minus 25° C. to 175° C. with preferred temperatures in the range of from about 25° C. to about 125° C. The temperature must be maintained below the point where the particular metal carbonyl reaction product decomposes under the carbon monoxide pressure in the reaction vessel. For group VB metals a preferred temperature range is about 25° C. to about 70° C., for group VIB metals a preferred range is about 50° C. to about 125° C. and for group VIIB metals a preferred range is about 100° C. to about 125° C. The reaction time may vary over wide limits to about 1 to about 100 hours. A preferred range of reaction time has been found to be from about 15 to about 80 hours.

The entire reaction is preferably carried out with the exclusion of air and moisture and this may be conveniently accomplished by mixing the reactants in an atmosphere of inert gas such as argon, nitrogen or helium and by employing dry, oxygen-free carbon monoxide.

Under the above described conditions there results or is produced the mononuclear transition metal carbonyls or the alkali metal derivatives of the binuclear carbonyl-forming transition elements having the formula

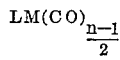
$$LM(CO)_{\frac{n-1}{2}}$$

wherein M, $n$ and L have the meanings defined hereinabove. The procedures used to recover the desired metal carbonyl from the reaction mixture vary depending upon the nature of the particular product. A variety of satisfactory recovery methods are well-known to those skilled in the art, and several specific recovery methods are described in the examples hereinbelow. In general, however, the solvent may be removed by evaporation under reduced pressure and the resulting solid treated with aqueous acid. The metal carbonyl may then be recovered from the aqueous acid mixture by extraction with a water immiscible organic solvent or by steam distillation. Because of the possibility that some of the alkali metal may fail to react, it is frequently advisable to treat the reaction mixture or the residue from solvent evaporation with ethanol or propanol to destroy any alkali metal which may remain. In the case of metals which form binuclear carbonyls the acidification of the crude reaction mixture is required to convert the alkali metal carbonyl derivatives to the desired binuclear transition metal carbonyls.

The following examples are illustrative of the process of the present invention:

Example I

In a dry box under at atmosphere of dry nitrogen 14.54 grams (0.05 mole) of vanadium tribromide 3.31 grams (0.022 mole) of diphenyl and 200 milliliters of dry ethylene glycol dimethyl ether were placed in a 500 milliliter stainless steel pressure vessel containing three stainless steel balls ½ inch in diameter. Two sealed glass ampoules containing a total of 12.67 grams of 40 percent sodium dispersion in toluene (0.22 mole of sodium metal) were then added and the pressure vessel was closed. The vessel was then placed in a rocking furnace and carbon monoxide was introduced to a final pressure of 850 p.s.i.g. at 28° C. The temperature rose to 30° C. The rocker was then turned on and the pressure dropped to 740 p.s.i.g. at 26° C. over a 20 minute period. The vessel was then heated to 35° C. over a 15 minute period the pressure rising to 750 p.s.i.g. The pressure then dropped steadily to 660 p.s.i.g. over a one hour period, the temperature falling to 32° C. during this time. The reaction mixture was maintained under these latter conditions for about 17 hours.

At the end of this time the pressure in the vessel had dropped to 500 p.s.i.g. at 25° C. corresponding to a total pressure drop of 240 p.s.i.g. The excess pressure was then vented and the product recovered in a dry box under a nitrogen atmosphere in subdued light. The contents of the pressure vessel were filtered and the resulting solution evaporated to dryness under reduced pressure. The yellow residue was then dissolved in 200 milliliters of distilled water, filtered and acidified with 20 milliliters of cold 50 percent sulphuric acid. The resulting aqueous solution was extracted with three 100 milliliter portions of toluene and the extracts were cooled separately in a carbon dioxide-acetone bath. The blue crystalline divanadium dodecacarbonyl which precipitated in the cold bath was recovered by filtration. The yield of $V_2(CO)_{12}$ was 2.2 grams, a yield of 20 percent based on vanadium tribromide. A comparable yield of product may be obtained by using vanadium trichloride as the starting material.

Example II

In a dry box under an atmosphere of dry nitrogen 6.3 grams (0.05 mole) of anhydrous manganous chloride, 10.6 grams of 40 percent sodium dispersion in toluene (0.18 mole of sodium metal), 2.6 grams (0.02 mole) of naphthalene and 200 milliliters of dry tetrahydrofuran were placed in a 500 milliliter pressure vessel. The vessel was closed, placed in a rocking furnace and pressurized to 525 p.s.i.g. with carbon monoxide and was then heated at about 127° C. for 16 hours. The pressure vessel was then cooled to 32° C. The carbon monoxide pressure dropped about 100 p.s.i.g. during the course of reaction. The vessel was then opened in a dry box under an atmosphere of dry nitrogen. The contents were filtered and the filtrate was evaporated to dryness under reduced pressure. The residue from the evaporation step was then treated with absolute ethanol, diluted with one liter of water, acidified with sulphuric acid, and steam distilled. The carbonyl reaction product was then extracted from the distillate with diethyl ether. Dimanganese decacarbonyl was isolated by evaporating the ether at room temperature. The yield of $Mn_2(CO)_{10}$ was 0.5 gram, or about 5 percent based on manganous chloride.

Example III

In a dry box under a nitrogen atmosphere 6.2 grams (0.05 mole) of chromium dichloride, 1.9 grams (0.012 mole) of diphenyl and 200 milliliters of ethylene glycol dimethyl ether were placed in a 500 milliliter stainless steel pressure vessel. A sealed glass ampoule containing 6.9 grams of 40 percent sodium dispersion in toluene (0.12 mole of sodium metal) and three stainless steel balls were then placed in the pressure vessel. The vessel was closed, placed in a rocking furnace and carbon monoxide was added to a final pressure of about 2050 p.s.i.g. The vessel was heated to 71° C. under a 30 minute period and was allowed to remain under pressure at this temperature for 16 hours. The vessel was then cooled to 27 degrees. The pressure drop during the course of the reaction was 240 p.s.i.g. The excess pressure was vented and the vessel was opened in a dry box under a nitrogen atmosphere and 25 milliliters of absolute ethanol were added to the reaction mixture. The mixture was then diluted with a liter of water containing 25 milliliters of glacial acetic acid and the resulting mixture was steam distilled. The metal carbonyl product was isolated from the distillate by filtration and was washed with a small quantity of toluene to remove traces of diphenyl. The yield of chromium hexacarbonyl was 2.9 grams, or 26 percent based on chromium dichloride.

*Example IV*

Following the procedure of Example III anhydrous molybdenum tribromide, sodium dispersion and diphenyl in a molar ratio of 1 to 3.5 to 0.35 and 200 milliliters of ethylene glycol dimethyl ether were mixed in a pressure vessel. Carbon monoxide was added to a pressure of about 2000 p.s.i.g. and the reaction vessel was heated at about 170° for about 16 hours. Molybdenum hexacarbonyl was recovered from the reaction mixture following the procedures of example III.

Additional examples of the process of the present invention are: The reaction of ferrous bromide, potassium and p,p'-dimethyl diphenyl and carbon monoxide in dioxane to give iron pentacarbonyl; the reaction of tantalum pentabromide with sodium dispersion, naphthalene and carbon monoxide in dimethyl ether followed by acidification of the reaction mixture to give ditantalum dodecacarbonyl; the reaction of nickel dichloride with sodium, alpha-methyl naphthalene and carbon monoxide in ethylene glycol dimethyl ether to give nickel tetracarbonyl; the reaction of tungsten hexaiodide with lithium, diphenyl and carbon monoxide in ethylene glycol dimethyl ether to give tungsten hexacarbonyl; and the reaction of cobalt dichloride with sodium, terphenyl and carbon monoxide in tetrahydrofuran followed by acidification of the reaction mixture to give dicobalt octacarbonyl.

The metal carbonyls produced by the process of the present invention are useful as metal plating agents and as anti-knock additives for motor fuels used in spark ignition engines.

What is claimed is:

1. In a process for producing transition metal carbonyls, said transition metal being selected from the metals of groups VB, VIB, VIIB, and VIII of the periodic table, the step which comprises contacting at a temperature between about −25° C. and about 175° C. the following: (1) an anhydrous transition metal halide selected from the group consisting of chloride, bromide and iodide, (2) an alkali metal, (3) from about one to about 100 mole per cent based on said alkali metal of at least one compound selected from the group consisting of polyphenyls, alkyl-substituted polyphenyls, aryl-substituted polyphenyls, naphthalene, alkyl-substituted naphthalenes, and aryl-substituted naphthalenes, (4) a liquid organic solvent selected from the group consisting of cyclic aliphatic ethers having not more than about 4 carbon atoms per oxygen atom and non-cyclic aliphatic ethers which contain a methoxy group and which have not more than about 4 carbon atoms per oxygen atom, and (5) carbon monoxide gas under pressure.

2. A process in accordance with claim 1 wherein said alkali metal is selected from the group consisting of lithium, sodium and potassium.

3. A process in accordance with claim 1 wherein said organic solvent in ethylene glycol dimethyl ether.

4. A process in accordance with claim 1 wherein said organic solvent is tetrahydrofuran.

5. A process in accordance with claim 1 wherein said catalyst is naphthalene.

6. A process in accordance with claim 1 wherein said catalyst is diphenyl.

7. A process in accordance with claim 1 wherein said temperature is in the range of from about 25° C. to 125° C.

8. A process in accordance with claim 1 wherein said carbon monoxide pressure is between about 450 p.s.i.g. and about 2500 p.s.i.g.

9. A process for preparing carbonyls of transition elements in group VB of the periodic table which comprises the steps of (A) contacting at a temperature between about 25° C. and about 70° C. the following: (1) an anhydrous halide of a group VB transition metal selected from the group consisting of chloride, bromide and iodide, (2) sodium metal, (3) from about 5 to about 10 mole percent based on said sodium metal of diphenyl, (4) ethylene glycol dimethyl ether solvent, and (5) carbon monoxide under pressure and (B) acidifying the reaction mixture from step A with aqueous acid.

10. A process for preparing carbonyls of transition elements in group VB of the periodic table which comprises the steps of (A) contacting at a temperature between about 25° C. and about 70° C. the following: (1) an anhydrous halide of a group VB transition metal selected from the group consisting of chloride, bromide and iodide, (2) sodium metal, (3) from about 5 to about 10 mole percent based on said sodium metal of diphenyl, (4) tetrahydrofuran and (5) carbon monoxide under pressure and (B) acidifying the reaction mixture from step A with aqueous acid.

11. A process for producing carbonyls of elements of group VIB of the periodic table which comprises contacting at a temperature between about 50° C. and about 125° C. the following: (1) an anhydrous halide to a group VIB transition metal selected from the group consisting of chloride, bromide and iodide, (2) sodium metal, (3) from about 5 to about 10 mole percent based on said sodium metal of diphenyl, (4) ethylene glycol dimethyl ether solvent, and (5) carbon monoxide gas under pressure.

12. A process for preparing carbonyls of transition elements in group VIIB of the periodic table which comprises the steps of (A) contacting at a temperature between about 100° C. and about 125° C. the following: (1) an anhydrous halide of a group VIIB transition metal selected from the group consisting of chloride, bromide and iodide, (2) sodium metal, (3) from about 5 to about 10 mole percent based on said sodium metal of naphthalene, (4) ethylene glycol dimethyl ether solvent, and (5) carbon monoxide under pressure and (B) acidifying the reaction mixture from step A with equeous acid.

13. A process for preparing carbonyls of transition elements in group VIIB of the periodic table which comprises the steps of (A) contacting at a temperature between about 100° C. and about 125° C. the following: (1) an anhydrous halide of a group VIIB transition metal selected from the group consisting of chloride, bromide and iodide, (2) sodium metal, (3) from about 5 to about 10 mole percent based on said sodium metal of naphthalene, (4) tetrahydrofuran and (5) carbon monoxide under pressure and (B) acidifying the reaction mixture from step A with aqueous acid.

14. A process for preparing divanadium dodecacarbonyl which comprises the steps of (A) contacting at a temperature between about 25° C. and about 40° C. the following: (1) an anhydrous vanadium halide selected from the group consisting of chloride, bromide and iodide, (2) sodium metal, (3) from about 5 to about 10 mole percent based on said sodium metal of diphenyl, (4) ethylene glycol dimethyl ether, and (5) carbon monoxide gas under pressure and (B) acidifying the reaction mixture from step A with aqueous acid.

15. A process for preparing dimanganese decacarbonyl which comprises the steps of (A) contacting at a temperature between about 100° C. and about 125° C. the following: (1) an anhydrous manganese halide selected from the group consisting of chloride, bromide and iodide, (2) sodium metal, (3) from about 5 to about 10 mole percent based on said sodium metal of naphthalene, (4) tetrahydrofuran, and (5) carbon monoxide gas under pressure and (B) acidifying the reaction mixture from step A with aqueous acid.

References Cited in the file of this patent
UNITED STATES PATENTS

| | | |
|---|---|---|
| 2,880,066 | Closson et al. | Mar. 31, 1959 |
| 2,952,521 | Podall | Sept. 13, 1960 |
| 2,952,522 | Podall | Sept. 13, 1960 |
| 2,952,523 | Podall | Sept. 13, 1960 |